US012707052B2

(12) United States Patent
Zhao et al.

(10) Patent No.: US 12,707,052 B2
(45) Date of Patent: Aug. 11, 2026

(54) IMAGE ENCODING/DECODING METHOD AND DEVICE, AND RECORDING MEDIUM IN WHICH BITSTREAM IS STORED

(71) Applicant: LG ELECTRONICS INC., Seoul (KR)

(72) Inventors: Jie Zhao, Seoul (KR); Seunghwan Kim, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/880,060

(22) PCT Filed: Jul. 3, 2023

(86) PCT No.: PCT/KR2023/009330

§ 371 (c)(1),
(2) Date: Dec. 30, 2024

(87) PCT Pub. No.: WO2024/005614

PCT Pub. Date: Jan. 4, 2024

(65) Prior Publication Data

US 2026/0019582 A1 Jan. 15, 2026

Related U.S. Application Data

(60) Provisional application No. 63/358,105, filed on Jul. 2, 2022, provisional application No. 63/357,653, filed on Jul. 1, 2022.

(51) Int. Cl.
*H04N 7/12* (2006.01)
*H04N 19/12* (2014.01)
(Continued)

(52) U.S. Cl.
CPC ........... *H04N 19/12* (2014.11); *H04N 19/176* (2014.11); *H04N 19/18* (2014.11); *H04N 19/60* (2014.11)

(58) Field of Classification Search
CPC ..................................................... H04N 19/12
See application file for complete search history.

(56) References Cited

U.S. PATENT DOCUMENTS

2020/0322636 A1 10/2020 Egilmez et al.
2021/0084301 A1 3/2021 Helle
(Continued)

FOREIGN PATENT DOCUMENTS

EP 3991413 A1 5/2022
GB 2585030 A 12/2020
(Continued)

*Primary Examiner* — Y Lee
(74) *Attorney, Agent, or Firm* — Bryan Cave Leighton Paisner LLP

(57) ABSTRACT

An image decoding method and device according to the present disclosure may determine a transform type for inverse transform of a current block from one or more MTS candidates available to the current block, and perform inverse transform on transform coefficients of the current block on the basis of the determined transform type, so as to acquire residual samples of the current block. Here, the number of the one or more MTS candidates available to the current block may be determined on the basis of at least one among a sum of the transform coefficients in the current block, the number of the transform coefficients in the current block, sizes of the one or more transform coefficients in the current block, a location of a last significant coefficient in the current block, and the number of one or more non-zero coefficients in the current block.

10 Claims, 8 Drawing Sheets

(51) Int. Cl.

| | |
|---|---|
| ***H04N 19/176*** | (2014.01) |
| ***H04N 19/18*** | (2014.01) |
| ***H04N 19/60*** | (2014.01) |

(56) References Cited

U.S. PATENT DOCUMENTS

| | | | | |
|---|---|---|---|---|
| 2021/0127112 | A1 | 4/2021 | Choi et al. | |
| 2026/0007960 | A1* | 1/2026 | Fujita | A63F 13/355 |
| 2026/0007961 | A1* | 1/2026 | Fujita | A63F 13/355 |
| 2026/0012617 | A1* | 1/2026 | Garus | H04N 19/176 |

FOREIGN PATENT DOCUMENTS

| | | | |
|---|---|---|---|
| KR | 20200015885 | A | 2/2020 |
| KR | 20210142642 | A | 11/2021 |
| KR | 20210158400 | A | 12/2021 |
| KR | 20220031030 | A | 3/2022 |
| WO | 2018166429 | A1 | 9/2018 |

* cited by examiner

IMAGE ENCODING/DECODING METHOD AND DEVICE, AND RECORDING MEDIUM IN WHICH BITSTREAM IS STORED

CROSS-REFERENCE TO RELATED APPLICATIONS

This application is the National Stage filing under 35 U.S.C. 371 of International Application No. PCT/KR2023/009330 filed on Jul. 3, 2023, which claims the benefit of earlier filing date and right of priority to U.S. Application No. 63/357,653, filed on Jul. 1, 2022, and U.S. Application No. 63/358,105, filed on Jul. 2, 2022, the contents of which are all hereby incorporated by reference herein in their entirety.

TECHNICAL FIELD

The present disclosure relates to an image encoding/decoding method and apparatus, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure is to provide a method and a device for determining a range of transform type candidates available to a current block.

The present disclosure is to provide a method and a device for adaptively applying MTS to a current block.

An image decoding method and device according to the present disclosure may determine a transform type for inverse transform of a current block from one or more MTS candidates available to the current block, and perform inverse transform on transform coefficients of the current block based on the determined transform type to acquire residual samples of the current block. Here, the number of one or more MTS candidates available to the current block may be determined based on at least one of a sum of transform coefficients in the current block, the number of transform coefficients in a current block, a size of one or more transform coefficients in a current block, a position of a last significant coefficient in the current block, or the number of one or more non-zero coefficients in the current block.

In an image decoding method and device according to the present disclosure, the number of one or more MTS candidates available to the current block may be determined based on a comparison between the sum of transform coefficients belonging to the current block and a predetermined threshold value.

In an image decoding method and device according to the present disclosure, when the sum of transform coefficients belonging to the current block is less than or equal to the first threshold value, the number of the one or more MTS candidates may be determined as $N_1$, when the sum of transform coefficients belonging to the current block is greater than the first threshold value and is less than or equal to the second threshold value, the number of the one or more MTS candidates may be determined as $N_2$, and when the sum of transform coefficients belonging to the current block is greater than the second threshold value, the number of the one or more MTS candidates may be determined as $N_3$.

In an image decoding method and device according to the present disclosure, the predetermined threshold value may be determined based on a predetermined constant factor, and the predetermined constant factor may be determined based on at least one of a slice type, a quantization parameter of the current block, a size of the current block, a shape of the current block, a ratio of a width and a height of the current block or information signaled through a bitstream.

In an image decoding method and device according to the present disclosure, the number of one or more MTS candidates available to the current block may be determined based on at least one of a position of a last significant coefficient in the current block, a scaling factor, a size of the current block or a shape of the current block.

In an image decoding method and device according to the present disclosure, the number of one or more MTS candidates available to the current block may be determined based on a comparison between the number of non-zero coefficients among the transform coefficients of the current block and a third threshold value.

In an image decoding method and device according to the present disclosure, when the number of one or more MTS candidates available to the current block is at least two, the transform type of the current block may be determined based on an MTS index signaled through a bitstream.

In an image decoding method and device according to the present disclosure, the maximum value (cMax) for binarization of the MTS index may be determined based on at least one of the sum of transform coefficients belonging to the current block, the number of transform coefficients in the current block, the size of one or more transform coefficients in the current block, the position of a last significant coefficient in the current block or the number of the non-zero coefficients among the transform coefficients of the current block.

An image encoding method and device according to the present disclosure may determine a transform type of a current block, and perform transform on residual samples of the current block based on a transform type of the current block to derive transform coefficients of the current block.

In an image encoding method and device according to the present disclosure, a transform type of the current block may be selected from one or more MTS candidates belonging to any one of a plurality of pre-defined candidate groups.

In an image encoding method and device according to the present disclosure, based on a candidate group where a transform type of the current block is selected, at least one of the sum of transform coefficients of the current block, the number of transform coefficients in the current block, a size of one or more transform coefficients in the current block, a position of a last significant coefficient in the current block or the number of non-zero coefficients in the current block may be required to belong to a predetermined range.

A computer-readable digital storage medium storing an instruction or a program causing an encoding device according to the present disclosure to perform an image encoding method is provided.

A computer-readable digital storage medium storing video/image information generated according to the image encoding method according to the present disclosure is provided.

A method and a device for transmitting video/image information generated according to an image encoding method according to the present disclosure are provided.

According to the present disclosure, by considering statistical characteristics of transform coefficients in a current block, the range of available transform type candidates may be adaptively controlled and the complexity of transform encoding may be reduced.

In addition, according to the present disclosure, by adaptively applying MTS based on statistical characteristics of transform coefficients in a current block, image encoding efficiency may be improved and the complexity of transform encoding may be reduced.

DETAILED DESCRIPTION

Figure 1:
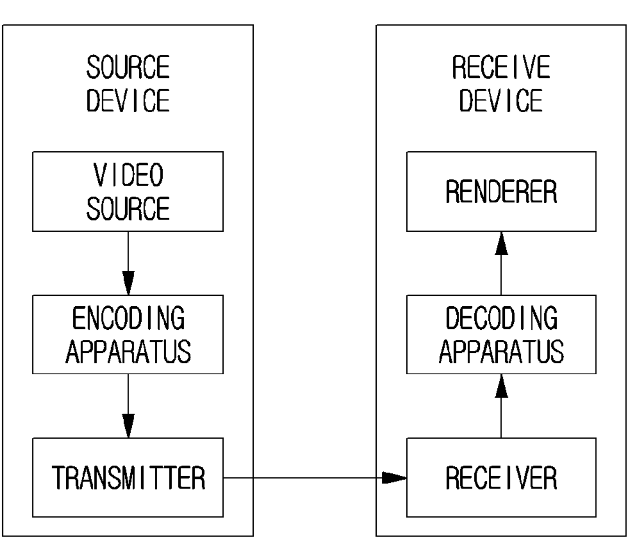
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in a video encoding codec where multiple transforms (multi transforms) are used such as the essential video coding (EVC) standard, the AOMedia Video 1 (AV1) standard, the 2nd generation of audio video coding standard (AVS2) or the next-generation video/image coding standard (ex. H.267 or H. 268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular region composed of a plurality of CTUS within a specific tile column and a specific tile row of one picture. A tile column is a rectangular region of CTUs having the same height as that of a picture and a width designated by a syntax requirement of a picture parameter set. A tile row is a rectangular region of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular region of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific region of a picture and information related to a corresponding region. One unit may include one luma block and two chroma (ex. cb, cr) blocks. In some cases, a unit may be used interchangeably with a term such as a block or an region, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding apparatus and a transmission unit. The receiving device may include a reception unit, a decoding apparatus and a renderer. The encoding apparatus may be referred to as a video/image encoding apparatus and the decoding apparatus may be referred to as a video/image decoding apparatus. A transmitter may be included in an encoding apparatus. A receiver may be included in a decoding apparatus. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding apparatus may encode an input video/image. An encoding apparatus may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding apparatus.

A decoding apparatus may decode a video/an image by performing a series of procedures such as dequantization, inverse transform, prediction, etc. corresponding to an operation of an encoding apparatus.

A renderer may render a decoded video/image. A rendered video/image may be displayed through a display unit.

Figure 2:
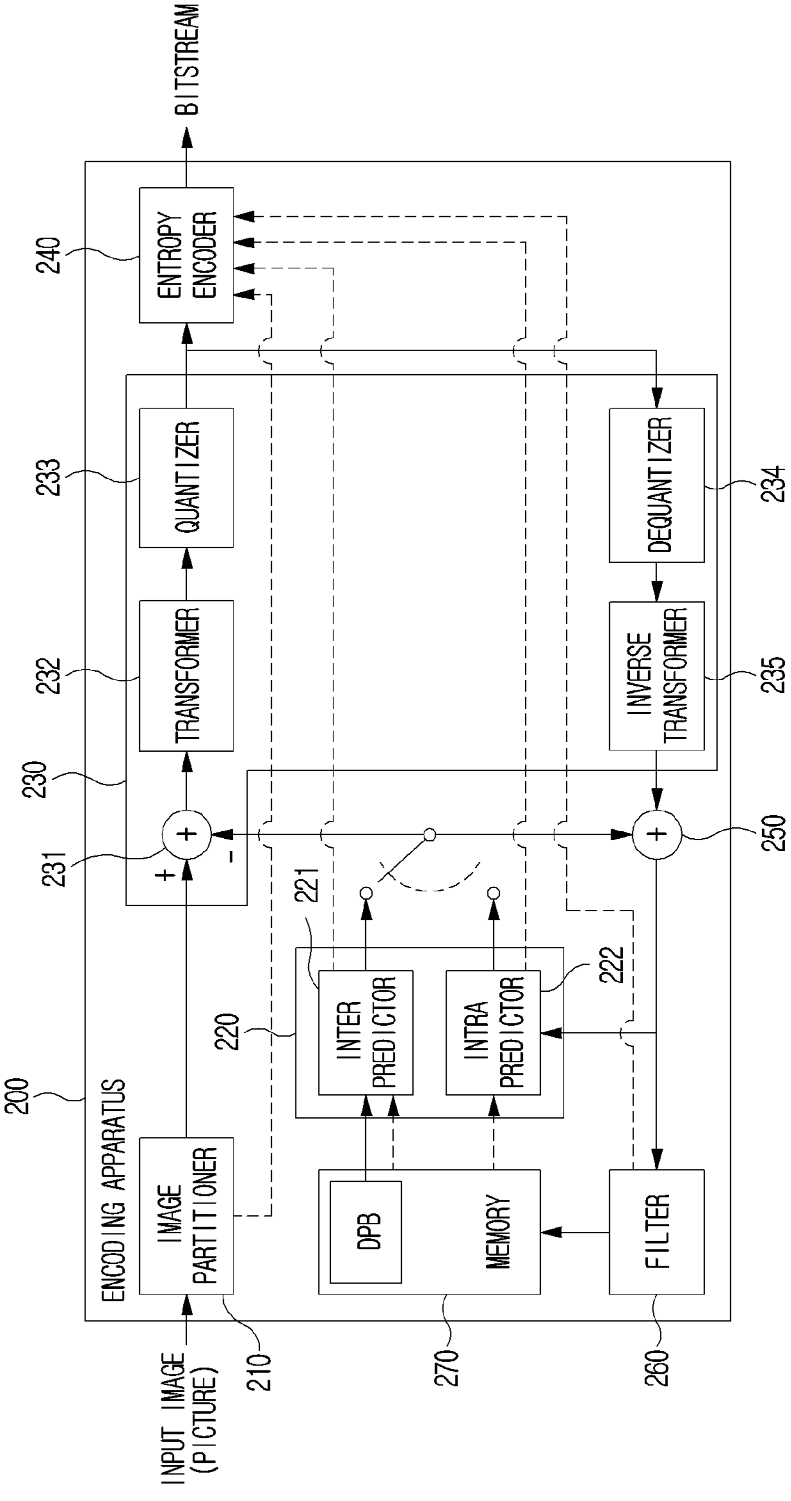
FIG. 2 shows a schematic block diagram of an encoding apparatus to which an embodiment of the present disclosure is applicable and encoding of video/image signals is performed.

FIG. 2 shows a rough block diagram of an encoding apparatus to which an embodiment of the present disclosure may be applied and encoding of a video/image signal is performed.

Referring to FIG. 2, an encoding apparatus 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding apparatus 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an region, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding apparatus 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding apparatus 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a neighboring block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding apparatus to a decoding apparatus may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding apparatus 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding apparatus may avoid prediction mismatch in an encoding apparatus 200 and a decoding apparatus, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
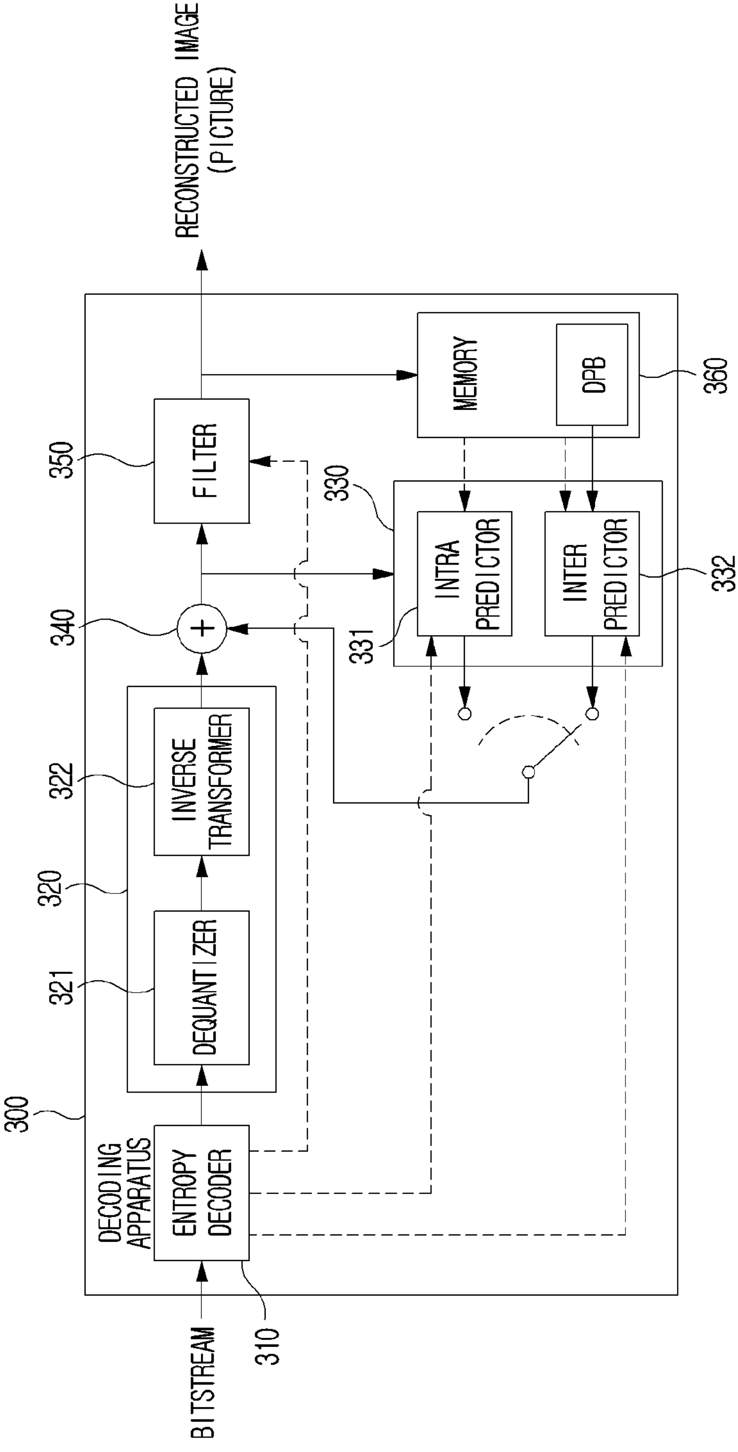
FIG. 3 shows a schematic block diagram of a decoding apparatus to which an embodiment of the present disclosure is applicable and decoding of video/image signals is performed.

FIG. 3 shows a rough block diagram of a decoding apparatus to which an embodiment of the present disclosure may be applied and decoding of a video/image signal is performed.

Referring to FIG. 3, a decoding apparatus 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding apparatus 300 may reconstruct an image in response to a process in which video/image information is processed in an encoding apparatus of FIG. 2. For example, a decoding apparatus 300 may derive units/blocks based on block partition-related information obtained from the bitstream. A decoding apparatus 300 may perform decoding by using a processing unit applied in an encoding apparatus. Accordingly, a processing unit of decoding may be a coding unit, and a coding unit may be partitioned from a coding tree unit or the target coding unit according to a quad tree structure, a binary tree structure and/or a ternary tree structure. At least one transform unit may be derived from a coding unit. And a reconstructed image signal decoded and output through a decoding apparatus 300 may be played through a playback device.

A decoding apparatus 300 may receive a signal output from an encoding apparatus of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding apparatus may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a neighboring block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding apparatus may be further configured as an internal/external element of a decoding apparatus 300 or a reception unit may be a component of an entropy decoder 310.

Meanwhile, a decoding apparatus according to this specification may be referred to as a video/image/picture decoding apparatus, and the decoding apparatus may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding apparatus. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter predictor 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding apparatus 200 may be also applied equally or correspondingly to a filter 350, an inter predictor 332 and an intra predictor 331 of a decoding apparatus 300, respectively.

Figure 4:
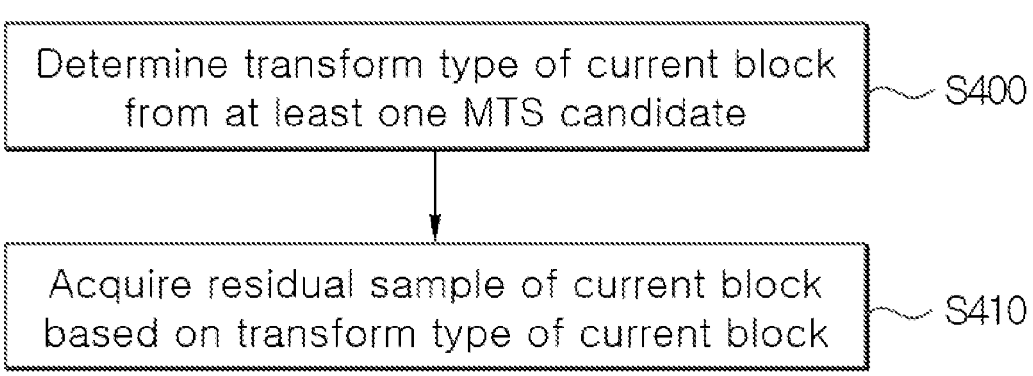
FIG. 4 shows an inverse transform method performed by a decoding device as an embodiment according to the present disclosure.

FIG. 4 shows an inverse transform method performed by a decoding device as an embodiment according to the present disclosure.

The present disclosure relates to an inverse transform method based on multi transform selection (MTS). The MTS may refer to a method for determining a transform type for horizontal/vertical transform by selecting any one of a plurality of transform type candidates. Hereinafter, a plurality of transform type candidates for the MTS are referred to as MTS candidates.

Each MTS candidate may include a transform type for horizontal transform and a transform type for vertical transform. Each MTS candidate may be configured by a combination of two of the transform types that are pre-defined equally for an encoding device and a decoding device. Here, pre-defined transform types may include at least one of one or more DCT-based first transform types or one or more DST-based second transform types. As an example, the first transform type candidate may include at least one of DCT-2, DCT-3, DCT-4, DCT-5 or DCT-8. The second transform type candidate may include at least one of DST-7, DST-1 or DST-4.

Alternatively, MTS candidates may be determined respectively by being divided into MTS candidates for horizontal transform and MTS candidates for vertical transform. In this case, each MTS candidate may include at least two of the transform types that are pre-defined equally for an encoding device and a decoding device. MTS candidates for horizontal transform may be used equally as MTS candidates for vertical transform.

Referring to FIG. 4, the transform type of a current block may be determined from one or more MTS candidates available to a current block (S400).

A transform type for horizontal and/or vertical transform of a current block may be determined respectively based on any one MTS candidate selected from the one or more MTS candidates.

The number of one or more MTS candidates available to the current block may be determined based on at least one of the sum of transform coefficients in a current block, the number of transform coefficients in a current block, a size of one or more transform coefficients in a current block, a position of a last significant coefficient or the number of one or more non-zero coefficients in a current block. The size of one or more transform coefficients in a current block may refer to the size of transform coefficient(s) greater than or equal to a specific threshold size. The size of one or more transform coefficients in a current block may refer to the size of transform coefficient(s) belonging to a specific position in a current block. Here, a specific position may include a top-left position in a current block and/or at least one sample position adjacent to a top-left position.

When the number of MTS candidates available to a current block is 1, it may mean that MTS is not applied to a current block. In this case, a corresponding MTS candidate may include DCT-2 and DCT-2 as a transform type for horizontal and vertical transform, respectively. On the other hand, when the number of MTS candidates available to a current block is 2 or more, it may mean that MTS is applied to a current block. Accordingly, whether MTS is applied to a current block may be determined based on a method for determining the number of MTS candidates available to a current block, which will be described later. In this case, a step of determining the transform type of a current block may include a step of determining whether MTS is applied to a current block.

Hereinafter, a method for determining the number of one or more MTS candidates available to a current block is described in detail.

Method 1: A Method Based on the Sum of Transform Coefficients

The number of one or more MTS candidates available to a current block may be determined based on whether the sum of transform coefficients belonging to a current block is greater than a predetermined threshold value. Here, the sum of transform coefficients may refer to the sum of absolute values of transform coefficients.

As an example, when the sum of transform coefficients belonging to a current block is less than or equal to a threshold value, the number of one or more MTS candidates may be $N_1$, and when the sum of transform coefficients belonging to a current block is greater than a threshold value, the number of one or more MTS candidates may be $N_2$. Here, a threshold value may be determined based on a predetermined constant factor (C). For example, the threshold value may be defined as 6*C. In addition, $N_1$ may be 1 and $N_2$ may be 4. However, it is not limited thereto, and $N_2$ may be an integer greater than $N_1$ such as 2, 3, 5, 6 or more.

Alternatively, when the sum of transform coefficients belonging to a current block is less than or equal to a threshold value, the number of one or more MTS candidates may be $N_1$, and when the sum of transform coefficients belonging to a current block is greater than a threshold value, the number of one or more MTS candidates may be $N_3$. Here, a threshold value may be determined based on a predetermined constant factor (C). For example, the threshold value may be defined as 32*C. In addition, $N_1$ may be 1 and $N_3$ may be 6. However, it is not limited thereto, and $N_3$ may be an integer greater than $N_1$ such as 2, 3, 4, 5 or more.

Alternatively, when the sum of transform coefficients belonging to a current block is less than or equal to a threshold value, the number of one or more MTS candidates may be $N_{22}$, and when the sum of transform coefficients belonging to a current block is greater than a threshold value, the number of one or more MTS candidates may be $N_3$. Here, a threshold value may be determined based on a predetermined constant factor (C). For example, the threshold value may be defined as 32*C. In addition, $N_2$ may be 4 and $N_3$ may be 6. However, it is not limited thereto, and $N_2$ may be an integer smaller than $N_3$ such as 2, 3, 5 or more and $N_3$ may be an integer greater than $N_2$ such as 3, 4, 5, 7 or more.

Alternatively, when the sum of transform coefficients belonging to a current block is less than or equal to the first threshold value, the number of one or more MTS candidates may be $N_1$. When the sum of transform coefficients belonging to a current block is greater than the first threshold value and less than or equal to the second threshold value, the number of one or more MTS candidates may be $N_2$. When the sum of transform coefficients belonging to a current block is greater than the second threshold value, the number of one or more MTS candidates may be $N_3$. Here, the first threshold value and the second threshold value may be determined based on a predetermined constant factor (C), respectively. For example, the first threshold value and the second threshold value may be defined as 16*C and 32*C, respectively. In addition, $N_1$, $N_2$ and $N_3$ may be 1, 4 and 6, respectively. However, it is not limited thereto, and $N_2$ may be an integer greater than $N_1$ and smaller than $N_3$ such as 2, 3, 5 or more. $N_3$ may be an integer greater than $N_2$ such as 2, 3, 5, 7 or more.

Information for determining at least one of a threshold value, the first threshold value, the second threshold value or a constant factor (C) described above may be signaled through a bitstream. The constant factor (C) may be a constant value that is pre-defined equally for an encoding device and a decoding device. Alternatively, a constant factor (C) may be variably determined based on at least one of a slice type, the quantization parameter (QP) of a current block, the size of a current block, the shape of a current block (i.e., whether it is non-square), the ratio of a width and a height of a current block or information signaled through a bitstream. Here, signaled information may be information encoded for determining at least one of a threshold value, the first threshold value, the second threshold value or a constant factor (C) described above.

As an example, when the quantization parameter of a current block is smaller than the first value, the constant factor may be determined as 2, and when the quantization parameter of a current block is greater than or equal to the first value, the constant factor may be determined as 1. Here, the first value may be 22.

Alternatively, when the quantization parameter of a current block is smaller than the first value, the constant factor may be determined as 2, and when the quantization parameter of a current block is greater than or equal to the first value, the constant factor may be determined as 0.5. Here, the first value may be 22.

Alternatively, when the quantization parameter of a current block is smaller than the second value, the constant factor may be determined as 2, and when the quantization parameter of a current block is greater than or equal to the second value, the constant factor may be determined as 0.5. Here, the second value may be 37.

Alternatively, when the quantization parameter of a current block is smaller than the first value, the constant factor may be determined as 2. When the quantization parameter of a current block is greater than or equal to the first value and less than the second value, the constant factor may be determined as 1. When the quantization parameter of a current block is greater than or equal to the second value, the constant factor may be determined as 0.5. Here, the first value and the second value may be 22 and 37, respectively.

As an example, when the size of a current block is less than the first size, the constant factor may be determined as 1, and when the size of a current block is greater than or equal to the first size, the constant factor may be determined as 2. Here, the first size may be 128. However, it is not limited thereto, and the first size may be 16, 32 or 64.

Alternatively, when the size of a current block is less than the first size, the constant factor may be determined as 1, and when the size of a current block is greater than or equal to the first size, the constant factor may be determined as 3. Here, the first size may be 128. However, it is not limited thereto, and the first size may be 16, 32 or 64.

Alternatively, when the size of a current block is less than the second size, the constant factor may be determined as 2, and when the size of a current block is greater than or equal to the second size, the constant factor may be determined as 3. Here, the second size may be 512. However, it is not limited thereto, and the second size may be greater than the first size and may be 32, 64, 128 or 256.

Alternatively, when the size of a current block is less than the first size, the constant factor may be determined as 1. When the size of a current block is greater than or equal to the first size and less than the second size, the constant factor may be determined as 2. When the size of a current block is greater than or equal to the second size, the constant factor may be determined as 1. Here, the first size and the second size may be 128 and 512, respectively. However, it is not limited thereto, and the first size may be 16, 32 or 64, and the second size is greater than the first size and may be 32, 64, 128 or 256.

As an example, when the ratio of a width and a height of a current block is less than the first value, the constant factor may be determined as 1. When the ratio of a width and a height of a current block is greater than or equal to the first value and less than the second value, the constant factor may be determined as 2. When the ratio of a width and a height of a current block is greater than or equal to the second value, the constant factor may be determined as 3.

The size of a current block described above may refer to the size of a transform block having the same size as a current block to be decoded or may refer to the size of the remaining regions excluding a high-frequency region where all transform coefficients are 0 within a corresponding transform block, i.e., a low-frequency region. Here, a size is defined as the total number of samples belonging to a current block (or a low-frequency region), but it is not limited thereto. For example, the size may be expressed as a width, a height, the minimum value/the maximum value of a width and a height or the sum of a width and a height.

Instead of the sum of transform coefficients in a current block, the number and/or the size of transform coefficients may be used to determine the number of MTS candidates. To this end, a term, 'the sum of transform coefficients', in the above-described method 1 may be applied by being replaced with 'the number of transform coefficients' or 'the size of one or more transform coefficients'. Alternatively, at least two of the sum, the number or the size of transform coefficients may be used together to determine the number of MTS candidates.

Method 2: A Method Based on the Position of the Last Significant Coefficient

The number of one or more MTS candidates available to a current block may be determined based on the position of the last significant coefficient in a current block. Here, the position of the last significant coefficient may be defined as scan order (or a scan position) according to a predetermined scan method. The scan method may be any one of diagonal scan, horizontal scan, vertical scan, z scan or raster scan. Alternatively, the position of the last significant coefficient may be defined as the coordinate of the last significant coefficient based on the top-left sample of a current block.

Specifically, the number of one or more MTS candidates available to a current block may be determined based on at least one of the position of the last significant coefficient in a current block, the size of a current block, the shape of a current block (i.e., whether it is non-square) and the ratio of a width and a height of a current block. As an example, the number of MTS candidates may be expressed as in Equation 1 below.

$$NumMtsCand = \min(\text{Max}NumMtsCand, (LastScanPos * \text{Scale}/cbSize)) \quad \text{[Equation 1]}$$

In Equation 1, NumMtsCand represents the number of one or more MTS candidates available to a current block. MaxNumMtsCand may represent the maximum number of MTS candidates pre-defined in an encoding device and a decoding device. LastScanPos may represent the position of the last significant coefficient in a current block and Scale may be a scaling factor applied to LastScanPos. The scaling factor may be a value pre-defined equally for an encoding device and a decoding device, and may be 1, 2, 3, 4, 5, 6 or more. cbSize represents the size of a current block, which is the same as described in 'Method 1 based on the sum of transform coefficients'.

According to Equation 1, the number of one or more MTS candidates available to a current block may be configured as (LastScanPos*Scale/cbSize). However, when the value of (LastScanPos*Scale/cbSize) exceeds the maximum number of pre-defined MTS candidates, the number of one or more MTS candidates available to a current block may be limited to the maximum number of pre-defined MTS candidates.

Alternatively, the number of one or more MTS candidates available to a current block may be determined based on whether the last significant coefficient exists in the top-left region of a current block (or a low-frequency region).

As an example, it is assumed that the width and height of a current block (or a low-frequency region) are W1 and H1, respectively, and the width and height of the top-left region are W2 and H2, respectively. W2 may be less than or equal to W1 and H2 may be less than or equal to H1. In this case, when the last significant coefficient does not exist in the top-left region of a current block (i.e., when the last significant coefficient exists in a region other than the top-left region of a current block), the number of one or more MTS candidates may be $N_1$. On the other hand, when the last significant coefficient exists in the top-left region of the current block, the number of one or more MTS candidates may be $N_2$. However, although the last significant coefficient exists in the top-left region of the current block, when the last significant coefficient exists at the top-left sample position of a current block (or a low-frequency region), i.e., at a DC position, the number of one or more MTS candidates may be $N_1$. Here, $N_1$ may be 1 and $N_2$ may be 4. However, it is not limited thereto, and $N_2$ may be an integer greater than $N_1$ such as 2, 3, 5, 6 or more.

Method 3: A Method Based on the Number of Non-Zero Coefficients

The number of one or more MTS candidates available to a current block may be determined based on whether the number of non-zero coefficients among the transform coefficients of a current block is greater than a predetermined threshold value.

For this purpose, the threshold value may be defined as at least one of the minimum number of non-zero coefficients (MinNumNonzero) for MTS to be allowed/applied to a current block or the maximum number of non-zero coefficients (MaxNumNonzero) for MTS to be allowed/applied to a current block. MinNumNonzero and MaxNumNonzero may be a number pre-defined equally for an encoding device and a decoding device, respectively. Alternatively, MinNumNonzero may be a pre-defined fixed number (e.g., 2) regardless of the size of a current block, and MaxNumNonzero may be a variable number determined based on the size of a current block. Meanwhile, in order to determine the number of one or more MTS candidates, both MinNumNonzero and MaxNumNonzero may be considered or only any one of MinNumNonzero or MaxNumNonzero may be considered.

As an example, when the number of non-zero coefficients belonging to a current block is less than MinNumNonzero, the number of one or more MTS candidates may be $N_1$, and when the number of non-zero coefficients belonging to a current block is greater than or equal to MinNumNonzero, the number of one or more MTS candidates may be $N_2$. Here, $N_1$ may be 1 and $N_2$ may be 4. However, it is not limited thereto, and $N_2$ may be an integer greater than $N_1$ such as 2, 3, 5, 6 or more.

Alternatively, when the number of non-zero coefficients belonging to a current block is greater than MaxNumNonzero, the number of one or more MTS candidates may be $N_1$, and when the number of non-zero coefficients belonging to a current block is less than or equal to MaxNumNonzero, the number of one or more MTS candidates may be $N_2$. Here, $N_1$ may be 1 and $N_2$ may be 4. However, it is not limited thereto, and $N_2$ may be an integer greater than $N_1$ such as 2, 3, 5, 6 or more.

Alternatively, when the number of non-zero coefficients belonging to a current block is less than MinNumNonzero, the number of one or more MTS candidates may be $N_1$. When the number of non-zero coefficients belonging to a current block is greater than or equal to MinNumNonzero or is less than or equal to MaxNumNonzero, the number of one or more MTS candidates may be $N_2$. When the number of non-zero coefficients belonging to a current block is greater than MaxNumNonzero, the number of one or more MTS candidates may be $N_1$. Here, $N_1$ may be 1 and $N_2$ may be 4. However, it is not limited thereto, and $N_2$ may be an integer greater than $N_1$ such as 2, 3, 5, 6 or more.

Methods 1 to 3 described above are an independent embodiment, and the number of one or more MTS candidates available to a current block may be determined by using any one of methods 1 to 3. Alternatively, the number of one or more MTS candidates available to a current block may be determined based on a combination of at least two of the above-described methods 1 to 3.

Hereinafter, a method for selecting the transform type of a current block from one or more MTS candidates available to a current block is described in detail.

When the number of one or more MTS candidates available to a current block is two or more, the transform type of a current block may be determined based on a MTS index. Here, a MTS index may specify any one of a plurality of MTS candidates. A transform type for horizontal transform and a transform type for vertical transform may be determined based on a MTS candidate specified by a MTS index.

Alternatively, a MTS index may be defined respectively for each transform direction. In this case, a MTS index may include a MTS index for horizontal transform and a MTS index for vertical transform. In this case, a transform type for the horizontal transform of a current block may be determined based on a MTS index for horizontal transform, and a transform type for the vertical transform of a current block may be determined based on a MTS index for vertical transform.

The MTS index may be signaled through a bitstream. The MTS index may be encoded through context-adaptive binary arithmetic coding (CABAC).

The maximum value (cMax) for the binarization of the MTS index may be variably determined based on the number of one or more MTS candidates determined based on at least one of the above-described methods 1 to 3. In other words, the maximum value (cMax) for the binarization of the MTS index may be determined based on at least one of the sum of transform coefficients belonging to a current block, the number of transform coefficients in a current block, the size of one or more transform coefficients in a current block, the position of the last significant coefficient in a current block or the number of non-zero coefficients among the transform coefficients of a current block. As an example, the maximum value (cMax) for the binarization of the MTS index may be configured as a value obtained by subtracting 1 from the number of one or more MTS candidates determined based on at least one of the above-described methods 1 to 3.

The MTS index may be derived based on the encoding parameter of a current block. Here, an encoding parameter may include at least one of a prediction mode showing an intra mode or an inter mode, the width and/or the height of a current block (or a transform block) or the partition information of a current block (or a transform block). The partition information may include at least one of information showing whether partition is performed, information showing a partition direction, information on the number of partitions generated through block partition, information on the position of a partition to which inverse transform is applied among the partitions generated through block partition or information showing whether asymmetrical partition is performed.

On the other hand, when the number of one or more MTS candidates available to a current block is 1, a transform type for horizontal transform and a transform type for vertical transform of a current block may be determined based on a corresponding MTS candidate. In this case, the MTS index may not be signaled through a bitstream and the MTS index may be derived as a value that is pre-defined equally for an encoding device and a decoding device.

Referring to FIG. 4, inverse transform may be performed on the transform coefficients of a current block based on the transform type of a current block to obtain the residual samples of a current block S410.

The inverse transform may be performed based on separate transform. As an example, vertical transform may be performed on each column of transform coefficients of a current block and horizontal transform may be performed on each row of result values thereof. Alternatively, horizontal transform may be performed on each row of transform coefficients of a current block and vertical transform may be performed on each column of result values thereof.

A current block may be reconstructed based on residual samples obtained through the inverse transform and the prediction samples of a current block.

Figure 5:
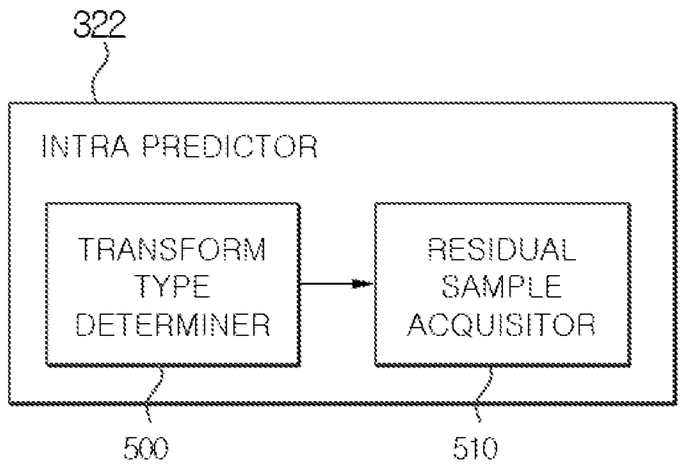
FIG. 5 shows a schematic configuration of an inverse transformer 322 performing an inverse transform method according to the present disclosure.

FIG. 5 shows a schematic configuration of an inverse transformer 322 performing an inverse transform method according to the present disclosure.

Referring to FIG. 4, an reverse transform method performed in a decoding device is described, which may be performed equally in the inverse transformer 322 of a decoding device, and a detailed description thereof is omitted.

Referring to FIG. 5, an inverse transformer 322 may include a transform type determiner 500 and a residual sample acquisitor 510.

A transform type determiner 500 may determine the transform type of a current block from one or more MTS candidates available to a current block. In other words, a transform type determiner 500 may select any one MTS candidate among the one or more MTS candidates and may determine a transform type for the horizontal and/or vertical transform of a current block based on a selected MTS candidate, respectively.

A transform type determiner 500 may determine the number of one or more MTS candidates available to the current block based on at least one of the sum of transform coefficients in a current block, the number of transform coefficients in a current block, the size of one or more transform coefficients in a current block, the position of the last significant coefficient or the number of one or more non-zero coefficients in a current block. To this end, at least one of methods 1 to 3 described by referring to FIG. 4 may be used.

Meanwhile, whether MTS is applied to a current block may be determined based on a method for determining the number of MTS candidates available to a current block. In this case, a transform type determiner 500 may determine whether MTS is applied to a current block.

When the number of one or more MTS candidates available to a current block is two or more, a transform type determiner 500 may determine the transform type of a current block based on a predetermined MTS index. The MTS index may be signaled through a bitstream or may be derived based on the encoding parameter of a current block.

On the other hand, when the number of one or more MTS candidates available to a current block is 1, a transform type determiner 500 may determine a transform type for horizontal transform and a transform type for vertical transform of a current block based on a corresponding MTS candidate.

A residual sample acquisitor 510 may perform inverse transform on the transform coefficient of a current block based on the transform type of a current block, obtaining the residual samples of a current block.

Figure 6:
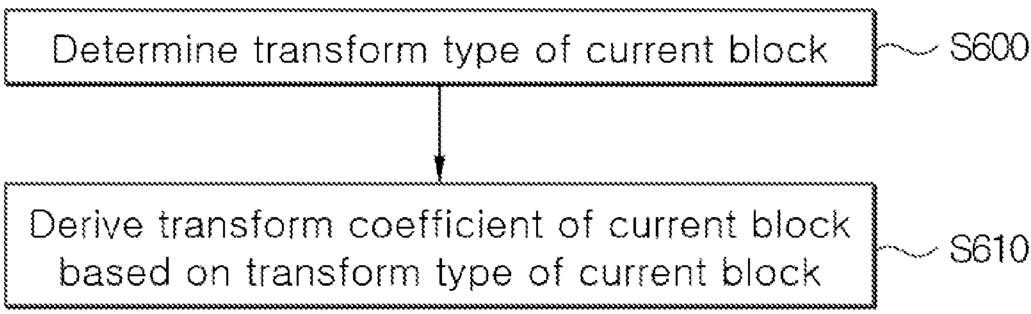
FIG. 6 shows an inverse transform method performed by an encoding device as an embodiment according to the present disclosure.

FIG. 6 shows an inverse transform method performed by an encoding device as an embodiment according to the present disclosure.

The present disclosure relates to a MTS-based transform method. As discussed above, MTS may refer to a method for determining a transform type for horizontal/vertical transform by selecting any one of a plurality of MTS candidates. Here, each MTS candidate may include a transform type for horizontal transform and a transform type for vertical transform. Alternatively, MTS candidates may be defined separately as MTS candidates for horizontal transform and MTS candidates for vertical transform.

Referring to FIG. 6, the transform type of a current block may be determined S600.

A transform type for horizontal and/or vertical transform of a current block may be determined respectively based on any one of the MTS candidates pre-defined for an encoding device and a decoding device. As described by referring to FIG. 4, each of the pre-defined MTS candidates may be configured as a combination of two of the transform types pre-defined equally for an encoding device and a decoding device. Alternatively, MTS candidates may be determined separately as MTS candidates for horizontal transform and MTS candidates for vertical transform. Alternatively, MTS candidates for horizontal transform may be used equally as MTS candidates for vertical transform.

Referring to FIG. 6, transform may be performed on the residual samples of a current block based on the transform type of a current block to derive the transform coefficients of a current block S610.

The transform may be performed in the reverse process of inverse transform described above. As an example, horizontal transform may be performed on each row of residual samples of a current block and vertical transform may be performed on each column of result values thereof.

Alternatively, vertical transform may be performed on each column of residual samples of a current block and horizontal transform may be performed on each row of result values thereof.

Transform coefficients derived through the transform may be encoded to generate the residual information of a current block and generated residual information may be inserted into a bitstream.

The transform type of the current block may be any one selected from one or more MTS candidates belonging to a predetermined candidate group. The predetermined candidate group may be any one of a plurality of candidate groups that are pre-defined equally for an encoding device and a decoding device. The plurality of candidate groups may include a different number of MTS candidates. As an example, a plurality of candidate groups may include at least two of the first candidate group, the second candidate group or the third candidate group. Here, the first candidate group may include $N_1$ MTS candidate(s), the second candidate group may include $N_2$ MTS candidates and the third candidate group may include $N_3$ MTS candidates.

Based on a candidate group where the transform type of the current block is selected (or the number of MTS candidates belonging to a corresponding candidate group), at least one of the sum of transform coefficients of the current block, the number of transform coefficients in a current block, the size of one or more transform coefficients in a current block, the position of the last significant coefficient or the number of non-zero coefficients in the current block may be required/limited to belong to a predetermined range.

Method 1: A Requirement for the Sum of Transform Coefficients

According to a candidate group where the transform type of a current block is selected, the sum of transform coefficients of the current block may be required to belong to a range less than or equal to a predetermined threshold value or may be required to belong to a range greater than a predetermined threshold value. Here, the sum of transform coefficients may refer to the sum of absolute values of transform coefficients.

As an example, when the transform type of the current block is selected from the first candidate group including $N_1$ MTS candidate(s), the sum of transform coefficients belonging to a current block may be less than or equal to a threshold value or may be greater than a threshold value. On the other hand, when the transform type of the current block is selected from the second candidate group including $N_2$ MTS candidate(s), the sum of transform coefficients belonging to a current block may be required to be greater than a threshold value. Here, a threshold value may be determined based on a predetermined constant factor (C). For example, the threshold value may be defined as 6*C. In addition, $N_1$ may be 1 and $N_2$ may be 4. However, it is not limited thereto, and $N_2$ may be an integer greater than $N_1$ such as 2, 3, 5, 6 or more.

Alternatively, when the transform type of the current block is selected from the first candidate group including $N_1$ MTS candidate(s), the sum of transform coefficients belonging to a current block may be less than or equal to a threshold value or may be greater than a threshold value. On the other hand, when the transform type of the current block is selected from the third candidate group including $N_3$ MTS candidate(s), the sum of transform coefficients belonging to a current block may be required to be greater than a threshold value. Here, a threshold value may be determined based on a predetermined constant factor (C). For example, the threshold value may be defined as 32*C. In addition, $N_1$ may be 1 and $N_3$ may be 6. However, it is not limited thereto, and $N_3$ may be an integer greater than $N_1$ such as 3, 3, 4, 5 or more.

Alternatively, when the transform type of the current block is selected from the second candidate group including $N_2$ MTS candidate(s), the sum of transform coefficients belonging to a current block may be required to be less than or equal to a threshold value. On the other hand, when the transform type of the current block is selected from the third candidate group including $N_3$ MTS candidate(s), the sum of transform coefficients belonging to a current block may be required to be greater than a threshold value. Here, a threshold value may be determined based on a predetermined constant factor (C). For example, the threshold value may be defined as 32*C. In addition, $N_2$ may be 4 and $N_3$ may be 6. However, it is not limited thereto, and $N_2$ may be an integer smaller than $N_3$ such as 2, 3, 5 or more and $N_3$ may be an integer greater than $N_2$ such as 3, 4, 5, 7 or more.

Alternatively, when the transform type of the current block is selected from the first candidate group including $N_1$ MTS candidate(s), the sum of transform coefficients belonging to a current block may be less than or equal to the first threshold value or may be greater than the first threshold value. When the transform type of the current block is selected from the second candidate group including $N_2$ MTS candidate(s), the sum of transform coefficients belonging to a current block may be required to be greater than the first threshold value and less than or equal to the second threshold value. When the transform type of the current block is selected from the third candidate group including $N_3$ MTS candidate(s), the sum of transform coefficients belonging to a current block may be required to be greater than the second threshold value. Here, the first threshold value and the second threshold value may be determined based on a predetermined constant factor (C), respectively. For example, the first threshold value and the second threshold value may be defined as 16*C and 32*C, respectively. In addition, $N_1$, $N_2$ and $N_3$ may be 1, 4 and 6, respectively. However, it is not limited thereto, and $N_2$ may be an integer greater than $N_1$ and smaller than $N_3$ such as 2, 3, 5 or more. $N_3$ may be an integer greater than $N_2$ such as 2, 3, 5, 7 or more.

Information for determining at least one of a threshold value, the first threshold, the second threshold or a constant factor (C) described above may be encoded and inserted into a bitstream. The above-described constant factor (C) may be a constant value that is pre-defined equally for an encoding device and a decoding device. Alternatively, a constant factor (C) may be variably determined based on at least one of a slice type, the quantization parameter (QP) of a current block, the size of a current block, the shape of a current block (i.e., whether it is non-square) or the ratio of a width and a height of a current block. In this case, information for determining a constant factor (C) may be additionally encoded and inserted into a bitstream. It is the same as described in detail by referring to FIG. 4.

Instead of the sum of transform coefficients in a current block, the above-described requirement may be applied to the number and/or the size of transform coefficients. For this purpose, a term, 'the sum of transform coefficients', in the method 1 may be applied by being replaced with 'the number of transform coefficients' or 'the size of one or more transform coefficients'. Alternatively, the above-described requirement may be applied together to at least two of the sum, the number or the size of transform coefficients.

Method 2: A Requirement for the Position of the Last Significant Coefficient

According to a candidate group where the transform type of a current block is selected, the last significant coefficient in a current block may be required to be positioned in a predetermined region within a current block or to exist at a predetermined position within a current block. Here, the position of the last significant coefficient may be defined as scan order (or a scan position) according to a predetermined scan method. The scan method may be any one of diagonal scan, horizontal scan, vertical scan, z scan or raster scan. Alternatively, the position of the last significant coefficient may be defined as the coordinate of the last significant coefficient based on the top-left sample of a current block.

As an example, when the transform type of the current block is selected from the first candidate group including $N_1$ MTS candidate(s), the last significant coefficient may be required to exist at a position where NumMtsCand in Equation 1 described above has a value of $N_1$. Likewise, when the transform type of the current block is selected from the second candidate group including $N_2$ MTS candidate(s), the last significant coefficient may be required to exist at a position where NumMtsCand has a value of $N_2$. When the transform type of the current block is selected from the third candidate group including $N_3$ MTS candidate(s), the last significant coefficient may be required to exist at a position where NumMtsCand has a value of $N_3$.

Alternatively, according to a candidate group where the transform type of a current block is selected, the last significant coefficient may be required to exist in a top-left region within a current block (or a low-frequency region).

As an example, it is assumed that the width and height of a current block (or a low-frequency region) are W1 and H1, respectively, and the width and height of the top-left region are W2 and H2, respectively. W2 may be less than or equal to W1 and H2 may be less than or equal to H1. When the transform type of the current block is selected from the first candidate group including $N_1$ MTS candidate(s), the last significant coefficient may exist in the top-left region of the current block or may exist in a region other than a top-left region within a current block. On the other hand, when the transform type of the current block is selected from the first candidate group including $N_1$ MTS candidate(s), the last significant coefficient may be required to exist in the top-left region of the current block. Furthermore, although the last significant coefficient exists in the top-left region of the current block, the last significant coefficient may be required not to exist at the top-left sample position of a current block (or a low-frequency region), i.e., a DC position. Here, $N_1$ may be 1 and $N_2$ may be 4. However, it is not limited thereto, and $N_2$ may be an integer greater than $N_1$ such as 2, 3, 5, 6 or more.

Method 3: A Requirement for the Number of Non-Zero Coefficients

According to a candidate group where the transform type of a current block is selected, the number of non-zero coefficients in the current block may be required to belong to a range less than or equal to a predetermined threshold value or may be required to belong to a range greater than a predetermined threshold value. Here, a threshold value may be defined as at least one of the minimum number of non-zero coefficients (MinNumNonzero) for MTS to be allowed/applied to a current block or the maximum number of non-zero coefficients (MaxNumNonzero) for MTS to be allowed/applied to a current block, which is the same as described by referring to FIG. 4.

As an example, when the transform type of the current block is selected from the first candidate group including $N_1$ MTS candidate(s), the number of non-zero coefficients belonging to a current block may be less than MinNumNonzero or may be greater than or equal to MinNumNonzero. On the other hand, when the transform type of a current block is selected from the second candidate group including $N_2$ MTS candidate(s), the number of non-zero coefficients belonging to a current block may be required to be greater than or equal to MinNumNonzero. Here, $N_1$ may be 1 and $N_2$ may be 4. However, it is not limited thereto, and $N_2$ may be an integer greater than $N_1$ such as 2, 3, 5, 6 or more.

Alternatively, when the transform type of the current block is selected from the first candidate group including $N_1$ MTS candidate(s), the number of non-zero coefficients belonging to a current block may be greater than MaxNumNonzero or may be less than or equal to MaxNumNonzero. On the other hand, when the transform type of the current block is selected from the second candidate group including $N_2$ MTS candidate(s), the number of non-zero coefficients belonging to a current block may be required to be less than or equal to MaxNumNonzero. Here, $N_1$ may be 1 and $N_2$ may be 4. However, it is not limited thereto, and $N_2$ may be an integer greater than $N_1$ such as 2, 3, 5, 6 or more.

Alternatively, when the transform type of the current block is selected from the first candidate group including $N_1$ MTS candidate(s), the number of non-zero coefficients belonging to a current block may be less than MinNumNonzero or may be greater than or equal to MinNumNonzero and MaxNumNonzero. On the other hand, when the transform type of the current block is selected from the second candidate group including $N_2$ MTS candidate(s), the number of non-zero coefficients belonging to a current block may be required to be greater than or equal to MinNumNonzero and less than or equal to MaxNumNonzero. Here, $N_1$ may be 1 and $N_2$ may be 4. However, it is not limited thereto, and $N_2$ may be an integer greater than $N_1$ such as 2, 3, 5, 6 or more.

The above-described methods 1 to 3 may be applied as an independent embodiment. Alternatively, based on a combination of at least two of the methods 1 to 3, at least two of the sum of transform coefficients, the position of the last significant coefficient or the number of non-zero coefficients may be required to belong to a predetermined range.

A MTS index indicating the selected MTS candidate may be encoded and inserted into a bitstream. When two MTS candidates are selected, a MTS index may be encoded and inserted into a bitstream for each transform direction.

The MTS index may be encoded through context-adaptive binary arithmetic coding (CABAC). The maximum value (cMax) for the binarization of the MTS index may be determined based on at least one of the sum of transform coefficients belonging to a current block, the number of transform coefficients in a current block, the size of one or more transform coefficients in a current block, the position of the last significant coefficient in a current block or the number of non-zero coefficients among the transform coefficients of a current block. Alternatively, the maximum value (cMax) for the binarization of the MTS index may be determined based on the number of MTS candidates belonging to a candidate group where the transform type of a current block is selected.

Alternatively, without encoding the MTS index, one or two MTS candidates among a plurality of MTS candidates may be selected based on the encoding parameter of a current block. Here, an encoding parameter may include at least one of a prediction mode showing an intra mode or an inter mode, the width and/or the height of a current block (or a transform block) or the partition information of a current block (or a transform block). The partition information may include at least one of information showing whether partition is performed, information showing a partition direction, information on the number of partitions generated through block partition, information on the position of a partition to which inverse transform is applied among the partitions generated through block partition or information showing whether asymmetrical partition is performed.

Figure 7:
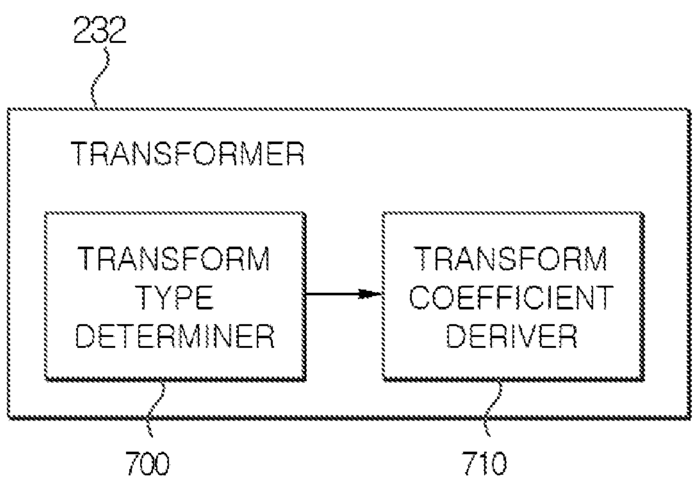
FIG. 7 shows a schematic configuration of a transformer 232 performing a transform method according to the present disclosure.

FIG. 7 shows a schematic configuration of a transformer 232 performing a transform method according to the present disclosure.

Referring to FIG. 6, a transform method performed in an encoding device was described, which may be performed equally in the transformer 232 of an encoding device, and a detailed description thereof is omitted below.

Referring to FIG. 7, a transformer 232 may include a transform type determiner 700 and a transform coefficient deriver 710.

A transform type determiner 700 may determine the transform type of a current block. In other words, a transform type determiner 700 may determine a transform type for horizontal and/or vertical transform of a current block respectively based on any one of the MTS candidates pre-defined in an encoding device and a decoding device.

A transform type determiner 700 may select a MTS candidate from any one of a plurality of candidate groups and determine a transform type for horizontal transform and/or a transform type for vertical transform of a current block based on a selected MTS candidate.

Alternatively, a transform type determiner 700 may select two MTS candidates from any one of a plurality of candidate groups. In this case, a transform type for horizontal transform of a current block may be determined based on any one of the two MTS candidates and a transform type for vertical transform of a current block may be determined based on the other.

A transform coefficient deriver 710 may perform transform on the residual samples of a current block based on the transform type of a current block to derive the transform coefficients of a current block.

The derived transform coefficients may be required to satisfy a requirement of at least one of the above-described methods 1 to 3 according to a candidate group where the transform type of the current block is selected (or, the number of MTS candidates belonging to a corresponding candidate group).

A MTS index indicating the selected MTS candidate may be encoded in an entropy encoder 240 and inserted into a bitstream. When two MTS candidates are selected, a MTS index may be encoded for each transform direction. An entropy encoder 240 may encode the MTS index through context-adaptive binary arithmetic coding (CABAC).

Alternatively, a transform type determiner 700 may select one or two MTS candidates based on the encoding parameter of a current block, and an encoding parameter here is the same as described above.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding apparatus and/or a decoding apparatus according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding apparatus and an encoding apparatus to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VOD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 8:
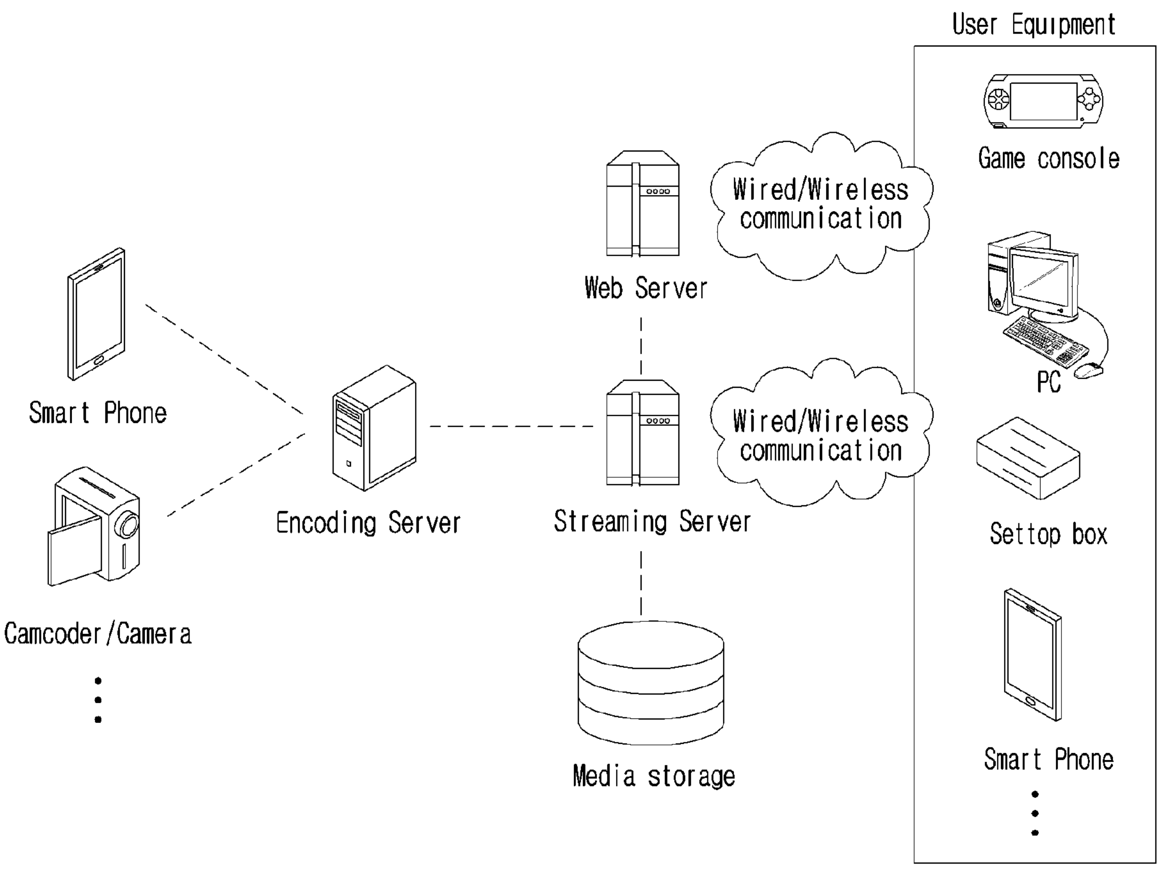
FIG. 8 shows an example of a contents streaming system to which embodiments of the present disclosure may be applied.

FIG. 8 shows an example of a contents streaming system to which embodiments of the present disclosure may be applied.

Referring to FIG. 8, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, comprising:

determining a transform type for an inverse transform of a current block from one or more multi transform selection (MTS) candidates available to the current block; and performing an inverse transform on transform coefficients of the current block based on the determined transform type to acquire residual samples of the current block, wherein a number of the one or more MTS candidates available to the current block is determined based on at least one of a sum of the transform coefficients in the current block, a number of the transform coefficients in the current block, a size of one or more transform coefficients in the current block, a position of a last significant coefficient in the current block, or a number of one or more non-zero coefficients in the current block.

2. The method of claim 1, wherein the number of the one or more MTS candidates available to the current block is determined based on a comparison between the sum of the transform coefficients belonging to the current block and a predetermined threshold value.

3. The method of claim 2, wherein the predetermined threshold value includes a first threshold value and a second threshold value, wherein when the sum of the transform coefficients belonging to the current block is less than or equal to the first threshold value, the number of the one or more MTS candidates is determined as $N_1$, wherein when the sum of the transform coefficients belonging to the current block is greater than the first threshold value and is less than or equal to the second threshold value, the number of the one or more MTS candidates is determined as $N_2$, and wherein when the sum of the transform coefficients belonging to the current block is greater than the second threshold value, the number of the one or more MTS candidates is determined as $N_3$.

4. The method of claim 2, wherein the predetermined threshold value is determined based on a predetermined constant factor, and wherein the predetermined constant factor is determined based on at least one of a slice type, a quantization parameter of the current block, a size of the current block, a shape of the current block, a ratio of a width and a height of the current block, or information signaled through a bitstream.

5. The method of claim 1, wherein the number of the one or more MTS candidates available to the current block is determined based on at least one of the position of the last significant coefficient in the current block, a scaling factor, a size of the current block, or a shape of the current block.

6. The method of claim 1, wherein the number of the one or more MTS candidates available to the current block is determined based on a comparison between a number of non-zero coefficients among the transform coefficients of the current block and a third threshold value.

7. The method of claim 1, wherein when the number of the one or more MTS candidates available to the current block is two or more, the transform type of the current block is determined based on an MTS index signaled through a bitstream.

8. The method of claim 7, wherein a maximum value (cMax) for a binarization of the MTS index is determined based on at least one of the sum of the transform coefficients belonging to the current block, the number of the transform coefficients in the current block, the size of the one or more transform coefficients in the current block, the position of the last significant coefficient in the current block, or the number of the non-zero coefficients among the transform coefficients of the current block.

9. An image encoding method, comprising:

determining a transform type of a current block; and performing a transform on residual samples of the current block based on the transform type of the current block to derive transform coefficients of the current block, wherein the transform type of the current block is selected from one or more multi transform selection (MTS) candidates belonging to any one of a plurality of pre-defined candidate groups, and wherein based on a candidate group where the transform type of the current block is selected, at least one of a sum of the transform coefficients of the current block, a number of the transform coefficients in the current block, a size of one or more transform coefficients in the current block, a position of a last significant coefficient in the current block, or a number of non-zero coefficients in the current block is required to belong to a predetermined range.

10. A method for transmitting data for an image, comprising:

acquiring a bitstream for the image, wherein the bitstream is generated by determining a transform type of a current block, performing a transform on residual samples of the current block based on the transform type of the current block to derive transform coefficients of the current block, and encoding the derived transform coefficients; and transmitting the data including the bitstream, wherein the transform type of the current block is selected from one or more multi transform selection (MTS) candidates belonging to any one of a plurality of pre-defined candidate groups, and wherein based on a candidate group where the transform type of the current block is selected, at least one of a size of one or more transform coefficients of the current block, a sum of transform coefficients of the current block, a number of the transform coefficients in the current block, the size of the one or more transform coefficients in the current block, a position of a last significant coefficient in the current block, or a number of non-zero coefficients in the current block is required to belong to a predetermined range.

* * * * *